United States Patent [19]

Baichtal et al.

[11] 4,011,542
[45] Mar. 8, 1977

[54] REDUNDANT DATA TRANSMISSION SYSTEM

[75] Inventors: James R. Baichtal; John C. McDonald, both of Los Altos, Calif.

[73] Assignee: TRW Inc., Los Angeles, Calif.

[22] Filed: Oct. 10, 1974

[21] Appl. No.: 513,880

Related U.S. Application Data

[62] Division of Ser. No. 365,045, May 29, 1973.

[52] U.S. Cl. .................. 340/147 LP; 340/410; 340/414; 340/147 SC
[51] Int. Cl.² ............... H04Q 9/00; G08B 19/00
[58] Field of Search ... 340/147 SC, 147 R, 147 LP, 340/412, 414, 410; 179/175.2 C, 18 EA; 178/69 G

[56] References Cited
UNITED STATES PATENTS

| | | | |
|---|---|---|---|
| 3,096,447 | 7/1963 | Hill et al. | 307/243 X |
| 3,335,229 | 8/1967 | Burke et al. | 179/18 EA |
| 3,409,877 | 11/1968 | Alterman et al. | 179/18 EA |
| 3,451,042 | 6/1969 | Jensen et al. | 340/147 R |
| 3,452,155 | 6/1969 | Stanley | 340/147 R X |
| 3,518,549 | 6/1970 | Sarati | 340/147 SC X |
| 3,519,755 | 7/1970 | Allum et al. | 179/18 EA |
| 3,624,372 | 11/1971 | Philip | 340/149 R |
| 3,701,853 | 10/1972 | Duval et al. | 179/18 EA X |
| 3,751,685 | 8/1973 | Jaeger | 307/219 |
| 3,796,837 | 3/1974 | Mathews | 179/18 EA |
| 3,803,568 | 4/1974 | Higashide | 307/219 |
| 3,865,999 | 2/1975 | Spitaels | 179/175.2 R |

*Primary Examiner*—Donald J. Yusko
*Attorney, Agent, or Firm*—Flehr, Hohbach, Test, Albritton & Herbert

[57] ABSTRACT

Disclosed is a redundant data transmission and storage system employed within a telephone message metering system. Information concerning local subscriber usage is transmitted over one of two redundant data paths where each data path is capable of independent operation. The selection of which data path, if any, is enabled in the active state is made by control networks, one associated with each data path. Under alarm conditions, the data path initiating the alarm causes its associated control network to be in the inactive state. The other control network, absent an alarm in its own data path, senses the inactive state of the other data path and enables its own data path in the active state. The control networks are responsive to alarms having different priorities. Some alarms cause a transfer of the active state while, under particular conditions, others do not.

9 Claims, 5 Drawing Figures

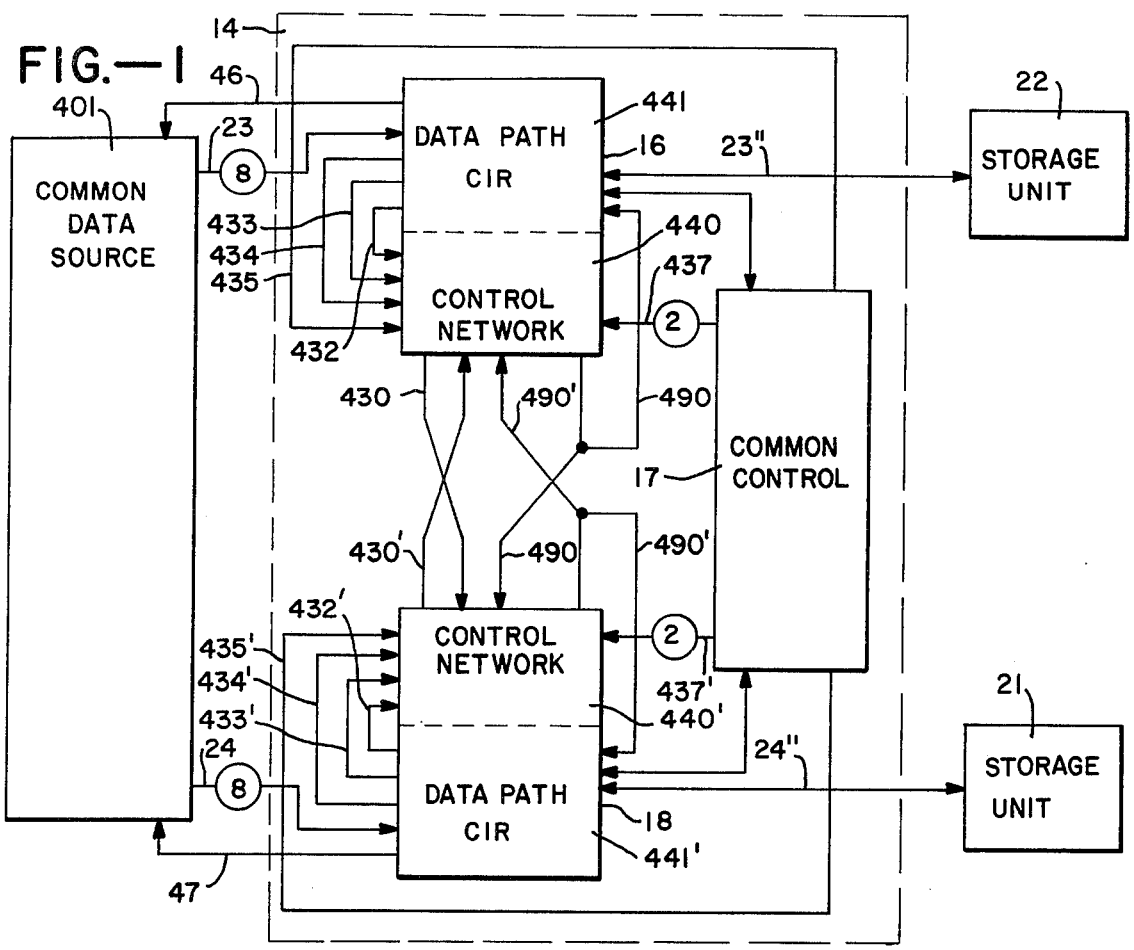

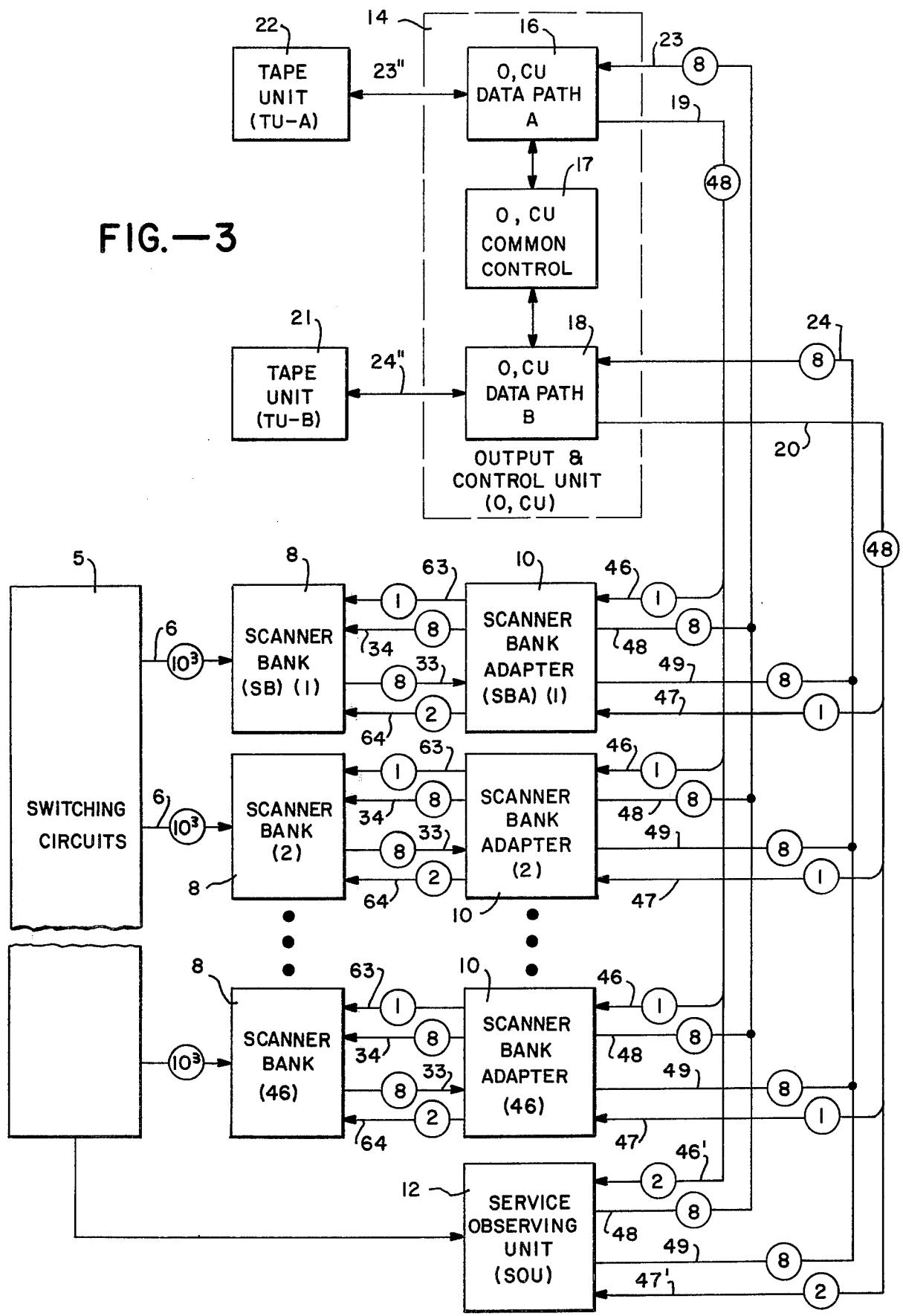
FIG.—3

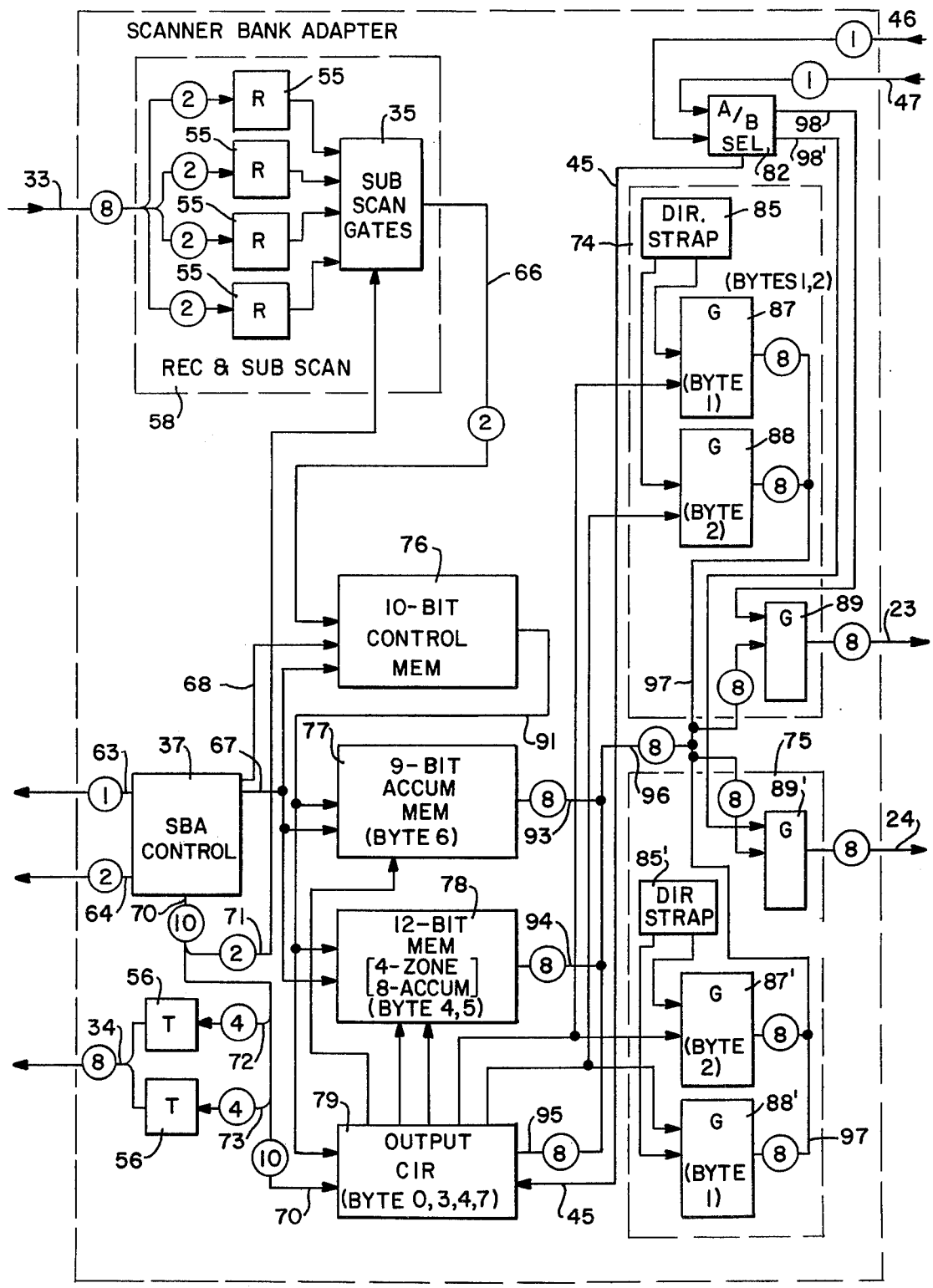
FIG.—4

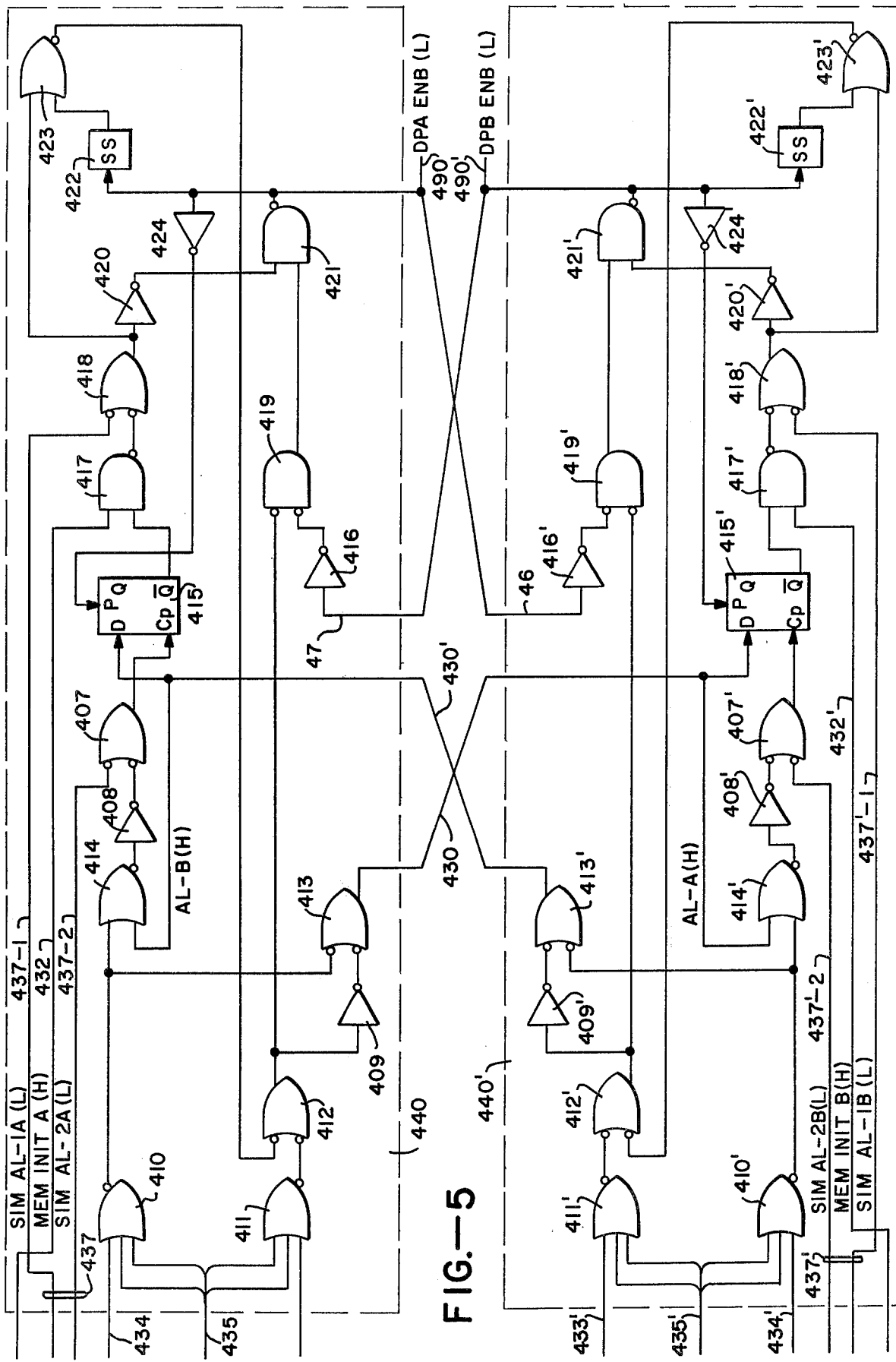
FIG.—5

REDUNDANT DATA TRANSMISSION SYSTEM

This is a division of application Ser. No. 365,045 filed May 29, 1973.

CROSS REFERENCE TO RELATED APPLICATIONS

1. MESSAGE METERING SYSTEM. Ser. No. 295,656, filed Oct. 6, 1972, now U.S. Pat. No. 3,818,456, invented by John C. McDonald and Dalton W. Martin, and assigned to TRW Inc.

2. MESSAGE METERING AND STORAGE SYSTEM, Ser. No. 321,275, filed Jan. 5, 1973, now U.S. Pat. No. 3,825,689, invented by John C. McDonald and James R. Baichtal, and assigned to TRW Inc.

3. SAMPLING AND ANALOG-TO-DIGITAL CONVERTER APPARATUS FOR USE IN A TELEPHONE MESSAGE METERING SYSTEM, Ser. No. 321,376, filed Jan. 5, 1973, now U.S. Pat. No. 3,852,533 invented by Gary C. Henrickson and John C. McDonald, and assigned to TRW Inc.

4. TAPE SPEED MONITOR, Ser. No. 365,029, filed May 29, 1973, now U.S. Pat. No. 3,818,456, invented by James R. Baichtal, and assigned to Vidar Corporation.

BACKGROUND OF THE INVENTION

The present invention relates to the field of data transmission and storage systems and particularly, to redundant data transmission and storage systems suitable for use where high reliability is required such as in telephone message metering systems.

Message metering equipment is employed for recording information resulting from toll, long distance and other types of telephone service. Such equipment requires the ability to detect, transmit and store information to enable usage-sensitive charging of subscribers. Local service by subscribers has generally been on a non-usage-sensitive basis employing equipment which has not been readily adapted to reliable metering on a usage-sensitive basis. With the advent of new types of local telephone usage such as credit-card checking, time-sharing data transmission, and burglary prevention, a need for reliably detecting, transmitting and storing information concerning the nature of local usage has become important.

While the use of redundancy is well-known for improving the reliability of any data transmission and storage system, prior art redundancy techniques have not provided sufficient capability for insuring the reliability and economy of information transmitted and stored in connection with the metering of telephone circuitry.

SUMMARY OF THE INVENTION

The present invention is a data transmission and storage system which includes redundant data paths. Each data path is enabled in the active state by an associated control network. Each control network is interconnected with other control networks to sense the active or inactive states of the other control networks. Each control network also includes means for sensing alarm signals in the associated data path. The alarm signals signify fault conditions or other conditions that indicate that the associated data path should be switched to the inactive state. Whenever a control network senses that another control network is in the inactive state, that control network responsively enables its own data path in the active state in the absence of an alarm in its own data path.

In the present invention, therefore, the control networks are responsive both to alarm conditions within the associated data path and to the status and alarm conditions of the other data path or paths.

In a further embodiment of the present invention, alarms associated with each data path are of two or more classes where each class has a different priority. One preferred embodiment of the present invention includes first and second class alarms. A control network sensing a first class alarm causes its associated data path to be in the inactive state. Another data path, not having a first class alarm, is caused by its associated control network to be enabled in the active state in response to the inactive state of the first data path. Second class alarms sensed by a control network cause that control network to disable the associated data path only upon the condition that another data path is available to be enabled in the active state.

While alarm signals generated for controlling the active and inactive states of data paths are produced as a result of fault or error conditions associated with a data path, alarm signals are also generated for other control purposes such as, for example, the automatic or manual transfer of the active or inactive state of a data path for any reason.

In accordance with the above summary of the invention, the present invention achieves the objective of providing a highly reliable redundant data transmission and storage system particularly suitable for use in telephone message metering systems.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 1 depicts a schematic representation of a two-data-path embodiment for transmitting and storing information from a common source.

FIG. 2 depicts a schematic representation of one circuit for generating alarm signals which are employed in selecting a data path in accordance with the present invention.

FIG. 3 depicts the present invention embodied in a message metering system for metering local telephone circuits.

FIG. 4 depicts further details of one scanner bank adapter employed in the message metering system of FIG. 3.

FIG. 5 depicts a detailed schematic representation of the control networks employed for selecting data paths in accordance with the present invention.

DETAILED DESCRIPTION

Referring to FIG. 1, a redundant data transmission and storage system is shown in accordance with the present invention. The system includes two redundant data paths which are capable of independent operation, but which are normally only energized one at a time.

The first data path is derived from the common data source 401 and comprises a bus 23 connected to data path circuitry 441 in turn connected via bus 23" to the storage unit 22. The second data path is also derived from the common data source 401 and comprises bus 24, data path circuitry 441', bus 24" to the storage unit 21. The first data path is generally designated as data path A and the second data path is generally designated as data path B. Data path A and data path B comprise redundant first and second data paths.

The selection of which data path, path A or path B is in the active state is under the control of control network 440 associated with data path A and control network 440' associated with data path B.

The control network 440 produces the enable output 490 which connects both to the data path circuitry 441 and to the control network 440'. Similarly, the control network 440' produces the enable output 490' also connecting to data path circuitry 441' and to the control network 440. The control networks 440 and 440' are additionally interconnected by alarm signal lines 430 and 430'. The line 430 connects from the network 440 to the network 440' to signal the existance of any alarm condition associated with the data path A. Similarly, the line 430' connects from the control network 440' to the control network 440 to signal the existence of any alarm associated with data path B.

The alarm signals are input to the control network 440 via the alarm buses 433, 434, 435 and to the control network 440' via buses 433', 434', 435'.

The alarms on lines 433 and 433' are alarms derived from tape speed monitors when the storage units 22 and 21 are magnetic tape drive units. The alarms on lines 435 and 435' are alarms derived from an error in the time of calendar clocks located within the data path circuitry 441 and 441'. The buses 434 and 434' are general buses representing a plurality of other alarms in the FIG. 1 system. The alarms may be derived from any point in the FIG. 1 circuitry. For simplicity, the alarms are generally designated as coming from the data path circuitry 441 and 441'. Common control 17 provides additional control signals to the data path circuitry 441 and 441' and specifically the simulated alarm signals on buses 437 and 437'.

In one preferred embodiment of the FIG. 1 system, alarms are classified with respect to fault conditions as class I alarms or as class II alarms. The calendar clock alarms on lines 435 and 435' are class II alarms while the tape speed alarms on lines 433 and 433' are class I alarms. Class I alarms are given a higher priority than class II alarms. The control networks 440 and 440' respond to the alarms in a different manner depending whether or not they are class I or class II alarms.

Other examples of alarms which may be employed in the present invention are parity errors. For example, the data path circuitry 441 checks the parity of the information received on bus 23 before transmitting it on bus 23''. If a parity error exists, an alarm is input to the control network 440, either as a class I alarm or as a class II alarm. Another type of an alarm signal which may be employed is a voltage level detector for detecting whenever the voltage level supplied to the various electronic components within the FIG. 1 apparatus is outside the safe operating range and which might therefore cause a loss of information in the FIG. 1 apparatus.

The particular class I alarm selected as an example is the tape speed alarm. Whenever the tape speed of a tape storage unit varies outside a safe range, information recorded may not be recoverable. The data path circuitry 441 and 441' each include tape speed monitors for monitoring the tape speeds of the associated storage units to insure that they are within the acceptable range. If they are not, a class I alarm signal is provided on the lines 433 and 433' to signal to the control networks 440 and 440' that appropriate action should be taken.

Specific details of a tape speed monitor suitable for use in generating an alarm signal for the present invention is described in the above-referenced copending application entitled TAPE SPEED MONITOR. The details of that application are hereby incorporated by reference in this specification for the purpose of teaching the generation of alarm signals.

A specific example of class II alarms is described in connection with lines 435 and 435' of FIG. 1 where calendar clock timing errors are generated when the FIG. 1 apparatus is embodied within a local message metering system. The calendar clocks are located in the data path circuitry 441 and 441' for generating date and time information. The date and time information is independently generated by separate timing sources in both circuitry 441 and 441'. The separately generated information in circuitry 441 and 441' is compared in the common control 17 every minute on the 30-second interval. If a difference in time exists an alarm is transmitted to the control networks via line 435, if the clock in circuitry 441 is slower than the clock in circuitry 441'. If the clock in the circuitry 441' is slower than the clock in the circuitry 441, then an alarm signal appears on line 435'. Specific details of the calendar clocks and the comparison circuitry are described in connection with FIG. 2.

Calendar Clocks (FIG. 2)

In FIG. 2, a calendar clock 443 is shown which is part of the data path circuitry 441 in FIG. 1. The calendar clock 443 calculates seconds, minutes, hours and days for inclusion with the message metering information output on bus 23'' to the storage unit 22. In a similar manner, the calendar clock 443' is part of the data path circuitry 441'. Clocks 443 and 443' concurrently and redundantly calculate the same time information. Since only one of the data paths A or B is normally active at any one time, only the information from one of the clocks 443 or 443', is actually utilized to store information at any one time.

In order to provide a check, however, on the accuracy of the calendar clocks 443 and 443', their outputs are compared at one minute intervals in a comparator 449 located in the common control 17 of FIG. 1 and as shown in FIG. 2. In FIG. 2, the calendar clock 443 includes a conventional 1.968MHz oscillator 444 which has its output connected to a divide-by-1.968M counter 445. The output of counter 445 produces pulses at a 1-second rate. The output from counter 445 is further divided in a divide-by-60 counter 446 which counts seconds. The parallel output from counter 446 on lines 451 is decoded for a count of 30 in decoder 450. Decoder 450 produces an output every minute on the 30 count of the 60 count counter 446. Counter 446 is typically a binary-coded-decimal (BCD) counter in which seven of its eight stages are employed to define the divide-by-60 count. The second's counter 446 is input to the divide-by-60 minute's counter 447. The parallel output from the counter 447 on bus 452 is input to the comparator 449. Counter 447 is typically a BCD counter in which output lines 452 include 7 bits for defining a divide-by-60 count. The output from the minute-counter 447 is input to further counting stages 448 which typically produce hours and days. All of the stages 445 through 448 have additional outputs which are input to shift register stages which are gated out on the output bus 23" of FIG. 1 for recording time and date information.

In an analogous manner to the calendar clock 443, the calendar clock 443' has the analogous stages 444' through 448' which have identical functions. The output from the counter 447' on 7-bit bus 452' is input to the comparator 449. Comparator 449 operates to compare counter 447 of the calendar clock 443 with counter 447' of the calendar clock 443'. If the count in counter 447 is greater than the count in counter 447', comparator 449 produces a 1 on output line 434'. If the count in counter 447' is greater than the count in counter 447, a 1 is output on the line 434. If the count in counters 447 and 447' are identical as they should be under alarm free operation, both outputs 434 and 434' are 0's. The alarm signals on lines 434 and 434', as shown in FIG. 1, connect from the common control 17 as inputs to the control networks 440 and 440', respectively. Those inputs serve as class II alarms to the control networks 440 and 440'.

Local Message Metering System (FIG. 3)

In FIG. 3, a local message metering system is depicted interconnected to subscriber metering lines. The FIG. 3 system is one preferred embodiment of the FIG. 1 system. In FIG. 3, the switching circuits 5, the scanner banks 8 and the scanner bank adapters 10 comprise the common data source 401 in FIG. 1. In FIG. 3, each of the scanner bank adapters 10 includes two redundant output buses 48 and 49. The buses 48 are OR'ed together and the buses 49 are OR'ed together as inputs to data path A on lines 23 and as inputs to data path B on lines 24, respectively. Lines 23 and 24 in FIG. 3 correspond to the like-numbered lines in FIG. 1.

In FIG. 3, the output and control unit (OCU) 14 corresponds to the like-numbered element in FIG. 1. The data path A circuitry 16 in FIG. 3 includes the data path circuitry 441 and the control network 440 of FIG. 1, while the data path B circuitry 18 includes the control network 440' and the data path circuitry 441' in FIG. 1. Specific details of the operation of the overall message metering system of FIG. 2 is described in the above-referenced application entitled MESSAGE METERING SYSTEM and that application is hereby incorporated by reference in this application for the purpose of teaching the general operation of a message metering system having redundant data paths.

Generally, in FIG. 3, the subscriber metering lines are output from switching circuits 5 and connect as inputs to the scanner banks 8. Switching circuits 5 are typically of the number 1 crossbar type well-known in the field of telephony.

The switching circuits 5 in FIG. 3 are organized with outputs in groups of 1000 ($10^3$). Those outputs correspond to the contiguous subscribers defined by the three low order digits of telephone directory numbers having common higher order digits. The directory numbers are in the base 10 numbering system. Each scanner bank 8 receives as inputs 1000 subscriber metering lines, one line associated with each subscriber signal. The scanner banks, for convenience, are organized in accordance with the binary number system and have provision for 1024 signals. The 24 extra locations, in addition to the 1000 subscriber signals, in each scanner bank are employed in connection with fault checking features of the system. Each scanner bank 8 periodically gates out 1024 signals, including the 1000 signals on the subscriber line inputs, to bus 33 in groups of four subscriber signals at a time. The subscriber signals are each defined by two binary bits. An 8-bit binary input address bus 34 periodically addresses and selects the outputs on bus 33. Each address bus 34 and each data bus 33 is connected between a scanner bank 8 and an associated scanner bank adapter 10. Additionally, a line 63 and two lines 64 connect, for error checking and control purposes, from each scanner bank adapter 10 to the associated scanner bank 8.

Still referring to FIG. 3, each scanner bank adapter 10 receives one set from a total of 256 sets, of four 2-bit signals (8 lines) on buses 33 where the particular set of four is specified by the 8-bit binary address on bus 34. The address on bus 34 is derived from the scanner bank adapter 10.

The input data bus 33 to each scanner bank adapter 10 carries information in digital form about the subscriber usage. That information is analyzed by the adapter and stored to enable a data read out from the adapter at appropriate times to record the usage of the system by each subscriber. The information is read out on an output data bus 48 associated with the data path B. The selection of whether the data path A bus 48 or the data path B bus 49 is the active one is under the control of the select lines 47 and 46, respectively. The select lines 46 and 47 are each one of the 48 select lines in the 48-bit select bus 19 and the 48-bit select bus 20, respectively. One of the select lines 46 or 47 is energized by the output and control unit (OCU) 14. The enable line 490 from control network 440 when 0 is operative in a conventional manner to enable selection of one bus 19 line 46. Similarly, the enable line 490' from control network 440' when 0 is operative to enable the selection of one bus 20 line 47. The 8-bit data buses 48 and 49 from each of the scanner bank adapters are all connected in common to the 8-bit data buses 23 and 24, respectively, which are input to the data path A circuitry 16 and the data path B circuitry 18, respectively, in the output and control unit 14. In addition to selecting one of the 46 scanner bank adapters 10 through appropriate selection of one of the 48 select lines 19 or one of the 48 select lines 20, the service observing unit 12 has two addresses which are selectable by two select lines 46' and 47' of the select lines 19 and 20, respectively, which are associated with the data path A and the data path B, respectively.

Still referring to FIG. 3, the output and control unit 14 has the data path A circuitry 16 connected to a tape unit 22 and the data path B circuitry 18 connected to a tape unit 21. Whenever the data path A or the data path B receives a signal from the SBA indicating that a subscriber line 6 has been active and the subscriber has terminated use of the subscriber line, the output and control unit recognizes the termination and causes the desired information about the subscriber's use of the system to be transferred out to the respective tape unit 21 or 22 depending upon whether data path A or data path B is operational.

Scanner Bank Adapter (FIG. 4)

Referring to FIG. 4, a typical scanner bank adapter 10 of the scanner bank adapters of FIG. 3 is shown in detail. The scanner bank 10 includes a receiver and subscan circuit 58 which receives the input data bits on bus 33. Circuit 58 scans the four pairs of input lines on bus 33 one pair at a time in gates 35 to select a pair, representing a single subscriber, as the output bus 66 from gate 35. Each one of the eight input lines for bus 33 is connected through a high impedance receiver 55. The selection of which of the four pairs of input lines on bus 33 is selected as the output 66 is under control of the two binary low order bits from the address generator in the SBA Control 37. Those two output low order bits appear on line 71 as an input to the gates 35. The binary control bits on line 71 are decoded in a conventional manner to select one of the four different pairs and connect the selected one on lines 66 as an input to the 10-bit control memory 76. Memory 76 has 1024 10-bit storage locations, one each for the 1000 subscribers signals, sixteen locations for the fixed addresses of the FAU (64) and eight additional locations for control and testing purposes. These eight additional locations account for the eight unused locations of LIU (63).

The 2-bit input line 66 to the memory 76 sequentially is connected to 1,024 different signals, 1000 of which represent usage information of telephone subscribers. The 2-bit binary code for each subscriber represents the four different states of each subscriber line 6 in FIG. 1 and that corresponding state for each subscriber is stored in the control memory 76. The memory address in the control memory 76 is incremented by the input from line 67 from the SBA Control 37 in synchronism with the subscan control line 71 so that subscriber addressing and memory addressing is carried out in synchronism.

The address signals for selecting subscribers or fixed addresses in the scanner bank are derived from the SBA Control 37 as an output on 10-bit bus 70. Bus 70 has its two low order bits connected on line 71 to the subscan gates 35. The next higher order four bits appear on line 72 and are connected through a transmitter 56 via bus 34 as an input to the receiver 55 and then via line 72' to the line decoder 30. Similarly, the highest order four bits are connected via line 73 through a transmitter 56 and bus 34 as an input in FIG. 2 to line 73' to the module decoder 32. Additionally, the 10 binary addressing bits of bus 70 are input to the output circuit 79.

The SBA Control 37 also generates a control signal on line 63 which connects to the line decoder 30 for de-energizing simultaneously all LIU. Similarly, control 37 has a 2-bit output on line 64 which connects as an input to all LIU and which is used for test purposes. SBA Control 37 has a 1 second timing circuit which delivers an output pulse on line 68 to the 10-bit control memory 76 for incrementing the time accumulation register in memories 77 and 78 associated with each subscriber as control memory 76 periodically addresses a control memory location corresponding to the subscriber connected on the input lines 66.

The accumulators associated with each subscriber for measuring the call duration have a lower order 8-bit field (plus a ninth parity bit) in a 9-bit accumulator memory 77. The memory 77 includes 1024 locations associated on a one-for-one basis with the 1024 locations in the 10-bit control memory 76, that is, one for each of 1000 subscribers and 24 for control. Memory 77 is synchronously addressed by the input signal on line 67 in the same manner as 76. An additional 8-bits of accumulated memory, for each of the 1000 locations associated with subscribers, exists in the 12-bit memory 78. Memory 78 is addressed synchronously with the memories 76 and 77 via the input on line 67. In addition to the 8-bit higher order accumulation field, memory 78 includes an additional four bits for storing zone information associated with each subscriber call.

The output circuit 79 functions to control the gating out of information stored in memories 77 and 78 certain other information via one of two redundant data paths A and B. The first redundant path includes data path A circuitry 74 and the second data path B circuitry 75. Each of the data path circuits 74 and 75 via gates 87 and 88 and 87' and 88', respectively, operates to connect to the outputs on buses 23 and 24, at appropriate times, binary-coded-decimal representations of the higher order four digits of each subscriber's 7-digit telephone directory number. That connection is done by the directory number straps 85 and 85'. The outputs from gates 87 and 88 and 87' and 88' are OR'ed together to form outputs on lines 97 and 97' which are each connected in common with the output on bus 96 to form inputs to the gates 89 and 89'. Bus 96 is an OR'ed output of the bus 93 from memory 77, the bus 94 from memory 78 and the bus 95 from output circuit 79. The input 8-bit buses to gates 89 and 89' receive eight different bytes of data depending upon the selection output from output circuit 79. Those eight bytes of information and their contents are described hereinafter in further detail. Briefly, bytes 0, 3 and 7 and one-half of byte four are derived directly from the output circuit 79 and are gated over bus 95 to bus 96 as an input to gates 89 and 89'.

The other half of byte 4 and all of byte 5 are gated by the SEL 4 and SEL 5 lines as outputs on bus 94 to bus 96 and to gates 89 and 89'. Byte 6 is gated by SEL 6 line as an output on bus 93 to bus 96 as inputs to gates 89 and 89'.

Bytes 1 and 2 are generated by the directory straps 85 and 85' and are gated as outputs on buses 97 and 97' as inputs to the gates 89 and 89', respectively.

The selection of which data path, data path A on bus 23 from gate 89 or data path B on bus 24 from gate 89' is under control of the A/B select circuit 82 responsive to inputs 46 and 47 from the output and control unit 14 of FIG. 1. Circuit 82 is operative to select either gate 89 via line 98 or gate 89' via line 98' depending on the energization of input lines 46 or 47, respectively. When either line 46 or 47 is energized, the select circuit 82 energizes output line 45 to the output circuit 79 for signaling that a byte 0 transfer is requested for that particular one scanner bank adapter 10 which is being selected in the system of FIG. 3. Only one adapter 10 in FIG. 3 is selected at any one time.

Control Networks (FIG. 5)

In FIG. 4, the control networks 440 and 440' of the output and control units 16 and 18, respectively, of FIG. 1 are shown in further detail. The control network 440 for the data path A is identical to the control network 440' for the data path B and the like elements in the network 440' are identified with primed numbers corresponding with the unprimed elements in network 440.

The alarm signals are input to the control network 440 on lines 433, 434 and 435. The alarm 433 is a class I alarm derived from the tape speed monitor and the storage unit 22 of FIG. 1. The alarm 435 is a class II alarm which is derived from the common control 17 calendar clock comparator. The alarm bus 434 includes both class I and class II alarms.

The class I alarms, of which the alarm on line 433 is typical, are input to NOR gate 411 which has its output connected to NAND gate 412. Any of the inputs to gate 411 are high or binary 1 for any alarm condition and are low or binary 0 for any non-alarm condition. Gate 412, in addition to the signals from gate 411 receives the output from NOR gate 423.

The output from gate 412 is input to the NOR gate 419 and input to inverter 409. Gate 419 switches its output to a 1 in response to a no alarm signal 0 from the gate 412 provided the enabling line 490' from the network 440' is inverted to 0 through the inverter 416. Gate 419 has its output connected to NAND gate 421. Gate 421 also receives an output from the inverter 420. NAND gate 421 is an enabling means which is responsive to an alarm signal, for example any alarm signal introduced through NOR gate 411, for forcing the data path A inactive. Gate 421 is also responsive to any alarm signal which is propagated through inverter 420.

Gate 421 has its output connected as an input to the control network 440' through the inverter 416'. In a similar manner, NAND gate 421' is an enabling means which is responsive to an alarm signal in the data path B for forcing data path B in the inactive state by controlling the signal on line 490'. Line 490' connects its input to the control network 440 via the inverter 416.

The NOR gate 419 is, therefore, a means responsive to the inactive state of the other data path, data path B, for enabling data path A in the active state by providing an output to the NAND gate 421.

The inactive state of data path B, represented by a 1 on line 490', is operative to enable data path A in the active state provided no alarm exists which is associated with data path A. The no alarm condition is represented by a 0 output from the NAND gate 412 which serves as one input to the NOR gate 419. If an alarm exists, the gate 412 output is a 1 so that the output of NOR gate 419 will remain low independent of the 1 or 0 level of the line 490'.

The class II alarms are input to the control networks through the NOR gates 410 and 410'. The output from gate 410 is connected as an input to NOR gate 414 and NAND gate 413.

The function of gate 413 is to produce a 1 on output line 430 whenever a class I or class II alarms exist. Similarly, any alarm in the network 440' produces a 1 on line 430' which is also input to the gate 414. Gate 414 functions to transmit a class II alarm, received as a 0 from gate 410, by providing by a 1 on its output unless there is a 1 on line 430' signaling an alarm condition in the network 440'. Gate 414 is connected through inverter 408 to a NAND gate 407. Gate 407 also receives a simulated alarm signal on line 437-2 which is normally in a 1 state unless a simulated class II alarm is being generated. NAND gate 407 connects to the clock input C of a conventional D-type flip-flop 415. Flip-flop 415 is operative to store the value on its D input derived from line 430', at a time when its clock input has a positive going pulse. The flip-flop 415 is normally in the high state with the Q output a 1 and the $\overline{Q}$ output a 0. Provided there is no alarm in the network 440', a class II alarm strobes the C input to flip-flop 415 thereby storing the 0 state on the D input forcing the $\overline{Q}$ output to a 1 and the Q output to a 0.

The output from flip-flop 415 is gated through NAND gate 417 to a NAND gate 418. Gate 417 is gated by a control line 432. The line 437-2 is a signal provided by the message metering system of FIG. 3 to indicate when the information in the data path A has been successfully stored in the storage unit 22. When operated in this fashion, line 432 insures that any class II alarm stored in flip-flop 415 will not be recognized by the control network 440 until a gating pulse is received on line 432. Alternatively, line 432 may be set as a 1 at all times so that gate 417 merely operates as an inverter.

NAND gate 418 receives the output from gate 417 and connects it to inverter 420 and the NOR gate 423. The other input to gate 418 is derived from line 437-1 which may be employed to simulate class I alarms. When simulating a class I alarm, line 437-1 is a 0 and at any other time is a 1. Any class II alarm from flip-flop 415, or any simulated alarm from lines 437-1 and 437-2, provides an alarm input to inverter 420 and the enabling means 421. In this fashion, the class II alarms or the simulated alarms are operative to disable the data path A in the same manner that the class I alarms disable the data path A through the NOR gate 419.

The function of the NOR gate 423 is to provide a signal back to the NAND gate 412 which in turn connects through inverter 409 to the gate 413. The output of gate 413 signals the existance of an alarm or a simulated alarm in the network 440.

The single-shot 422 senses a 0 to 1 transition from the output of gate 421 and provides a 1 level pulse into the NOR gate 423. Single-shot 422 insures that even short duration outputs of gate 421 will be sensed. The output of gate 423 connects to the gate 412 and returns through gate 419 as an input to gate 421. Gate 421 is then held in the 1 state as a result of the action of single-shot 422.

While the inputs on lines 437-1 and 437-2 have been indicated as simulated alarms, they also can be considered as alarm signals of different priority than the class I and class II alarms.

OPERATION

The operation of the control networks 440 and 440' of FIGS. 1 and 5 are described in connection with the following CHART I in which fifteen cases of alarm conditions and activity states are shown. The alarm conditions selected for examples are those of tape speed error for class I type alarms and calendar clock error for class II alarms.

In case 1 of CHART I the condition is represented where no alarm of any type exists for either data path A or data path B. Under these conditions, the lines 433, 435, 433' and 435' are all in the 0 state. The prealarm status of the enable lines 490 and 490' remains as the postalarm status in the absence of alarms. Specifically in case 1, line 490 as a 0 enables data path A active while line 47 as a 1 forces data path B inactive as indicated in CHART I under the L490 and L490' columns.

CHART I

| CASE | PREALARM DP A L490 | PREALARM DP B L490' | ALARMS DP A L433 AL I | ALARMS DP A L435 AL II | ALARMS DP B L433' AL I | ALARMS DP B L435' AL II | POSTALARM DP A L490 | POSTALARM DP B L490' |
|---|---|---|---|---|---|---|---|---|
| 1  | 0 | 1 | 0 | 0 | 0 | 0 | 0 | 1 |
| 2  | 1 | 0 | 0 | 0 | 0 | 0 | 1 | 0 |
| 3  | 0 | 1 | 1 | 0 | 0 | 0 | 1 | 0 |
| 4  | 1 | 0 | 1 | 0 | 0 | 0 | 1 | 0 |
| 5  | 0 | 1 | 0 | 1 | 0 | 0 | 1 | 0 |
| 6  | 1 | 0 | 0 | 1 | 0 | 0 | 1 | 0 |
| 7  | 0 | 1 | 1 | 0 | 1 | 0 | 1 | 1 |
| 8  | 0 | 1 | 0 | 1 | 1 | 0 | 0 | 1 |
| 9  | 1 | 0 | 0 | 1 | 1 | 0 | 0 | 1 |
| 10 | 0 | 1 | 0 | 1 | 0 | 1 | 0 | 1 |
| 11 | 1 | 0 | 0 | 1 | 0 | 1 | 1 | 0 |
| 12 | 0 | 1 | 1 | 1 | 0 | 1 | 1 | 0 |
| 13 | 1 | 0 | 1 | 1 | 0 | 1 | 1 | 0 |
| 14 | 0 | 1 | 1 | 0 | 0 | 1 | 1 | 0 |
| 15 | 1 | 0 | 1 | 0 | 0 | 1 | 1 | 0 |

Referring to FIG. 5 where the case 1, CHART I, prealarm status has a 0 for line 490 and a 1 for line 490', the inputs on all lines 433, 434 and 435 and their respective primed counterparts for the control network 440' are 0. With 0's on the inputs to NOR gate 411, its output is a 1 to the NAND gate 412. The 1 input to gate 412 coupled with a 1 input from NOR gate 423 produces a 0 output from gate 412. The 0 output from gate 412 is in input to NOR gate 419. Since for case 1 of CHART I the output on line 490' is a 1, the inverter 416 converts that 1 to a 0 as the second input to NOR gate 419. The two 0 inputs to the gate 419 produce a 1 output NAND gate 421. Gate 421 combines the 1 output from inverter 420 and gate 419 to produce a 0 output which enables data path A.

Still referring to case 1 of CHART I, the output from the NOR gate 410 with 0 inputs for all class II alarms is a 1. The 1 from gate 410 is supplied to the NOR gate 414 and the NAND gate 413. Under the no alarm condition, gate 413 receives the 1 from gate 410 and receives a 1 from inverter 409 so as to produce a 0 on output line 430 indicating that no alarm exists in the network 440. In a similar manner, the network 440' produces a 0 on line 430' indicating that no alarm exists in the network 440'. The 0 on line 430' together with the 1 from gate 410 are input to the NOR gate 414. Gate 414 produces a 0 output which is converted to a 1 by inverter 408 and input to the NAND gate 407. The other input on line 437-2 to gate 407 is normally a 1 so that gate 407 produces a 0 output. The 0 output from gate 407 is input to the flip-flop 415 and does not trigger flip-flop 415 since no positive going transition occurs. Flip-flop 415 has been preset with a 1 on its Q output by the inverter 424 which inverts the 1 on line 490 to a 0 at the P input of the flip-flop 415. With flip-flop 415 preset, it has a 0 on its $\bar{Q}$ output so that NAND gate 417 has its output forced to a 1 independent of the normally 0 input on line 432.

Line 437-1 is a 1 so that the two 1 inputs to NAND gate 418 combine to produce a 0 output. That 0 output is connected to NOR gate 423 and is converted to a 1 in inverter 420. The 1 from inverter 420 along with the 1 from the NOR gate 419 together produce the 0 output from NAND gate 421 thus enabling data path A with a 0 on line 490.

With a 0 output from NAND gate 418, and with a 0 output from the single-shot 422, the output from NOR gate 423 is a 1. The 1 is input to the NAND gate 412 which provides the 0 output as previously described.

In case 1 of CHART I the prealarm and postalarm conditions of lines 490 and 490' are not changed. In a similar manner, in case 2 the prealarm and postalarm conditions of lines 490 and 490' are not changed because again no alarms are generated.

Referring now to case 3 of CHART I, the prealarm conditions have data path A active as indicated by the 0 in the L490 column and has data path B inactive as indicated by the 1 in the L490' column. Data path A is operative in case 3 with a class I type alarm as indicated by a 1 in the line 43 column. No other alarms exist in data path A or data path B as indicated by the 0's in the columns L435, L433' and L435'. The postalarm status of data path A and data path B results in data path A inactive as indicated by the 1 in the L490 postalarm column with data path B active as indicated by the 0 in the L490' postalarm column.

Referring to FIG. 5 with a class I alarm, line 433 switches from 0 to a 1. With the 0 to 1 transition on line 433, the NOR gate 411 has its output switch from a 1 to a 0, responsively. The 1 to 0 input to NAND gate 412 forces its output from 0 to 1. That 0 to 1 transition is input to the NOR gate 419 causing the gate 419 to have an output which changes from 1 to 0. The transition of NOR gate 419 is independent of the input level from the inverter 416. The output of gate 419 therefor, goes from 1 to 0 providing a 1 to 0 input to NAND gate 421. The 0 input to gate 421 forces its output to switch from 0 to 1. Accordingly, line 490 designates the inactive state of data path A providing a 1 input to the inverter 416'. The output of inverter 416' therefor, switches from 1 to 0 providing an input to NOR gate 419'. In the absence of any alarms in the data path B, the output of NAND gate 412' is a 0 so that NOR gate 419' receives two 0's on its inputs. The 0 inputs cause a change from a 0 to a 1 on the output of gate 419. Since the output from gate 420' is also a 1 in the absence of any alarm signal, the two 1 inputs to NAND gate 421' force a 0 output on line 490'. Line 490' with a 0 enables data path B in the active state while data path A has been switched to the inactive state.

Referring now to CHART I, case 4, data path B is active and data path A is inactive when an alarm associated with data path A occurs. Under these conditions, no change occurs in the postalarm status of data path A and data path B. No change in the control networks 440 and 440' occurs because in case 4 with line 490' a 0, the output from inverter 416 is a 1 and the 0 to 1 transition on the other input to NOR gate 419 has no effect since gate 419 already has a 0 output. Any 0 input to NAND gate 421 forces its output to a 1.

Referring to CHART I, case 5, data path A is active and data path B is inactive. A class II alarm occurs as indicated by the 1 in the L435 column and no other alarms are present. The postalarm condition reveals data path A switched to inactive while data path B is switched to active.

Referring now to FIG. 5, in the case 5 of CHART I, the 0 to 1 transition on line 435 signals a class II alarm and causes the NOR gate 410 output to go from 1 to 0. The 1 to 0 transition is input to the NOR gate 414 causing its output to go from 0 to 1 which is inverted in inverter 408 causing a 1 to 0 transition on the input to NAND gate 407. A 0 input to gate 407 forces its output from 0 to 1 rendering a positive going transition on the clock input to flip-flop 415 causes the flip-flop to store the level of the signal on its D input. That D input is derived as the output of the line 430' from the control network 440'. In the absence of an alarm associated with data path B, line 430' is a 0. That 0 is stored in flip-flop 415 causing its $\overline{Q}$ output to be a 1. The 1 output from flip-flop 415 coupled with the 1 on line 432 after the memory pulse occurs, forces the output of gate 417 to a 0. The 0 input to gate 418 forces its output to a 1 which is inverted in inverter 420 to a 0. The 0 input to NAND gate 421 forces its output to a 1 thereby, forcing data path A to the inactive state. The 1 output from gate 418 is also received by NOR gate 423 forcing its output to a 0 which is received by NAND gate 412. Gate 412 receiving a 0 input forces its output to a 1 which is inverted in inverter 409 to a 0 forcing NAND gate 413 to have a 1 output which thereby signifies that the control network 440 senses an alarm.

The 1 output from NAND gate 421 is inverted in inverter 416' of the control network 440' to a 0. In the absence of any alarm signal from gate 412', the other input to NOR gate 419' is a 0 so that the two 0's force the output from gate 419' to a 1. The NAND gate 421' therefore, receives two 1 inputs forcing its output on line 490' to a 0 thereby placing data path B in the active state.

While a number of the cases of CHART I have been described in detail, each of the other cases in CHART I similarly cause the apparatus of the present invention to operate as indicated. While other permutations of the variables indicated in CHART I are possible, they are subsumed into the cases represented in the CHART I.

FURTHER AND OTHER EMBODIMENTS

While the redundant data transmission system of the present invention has been described with respect to two control networks and two associated data paths, more than two control networks and associated data paths may be employed within the scope of the present invention.

For a system with three redundant data paths of the type described in the present invention, three control networks like control network 440 of FIG. 5 are employed. For example, control network 440 and control network 440' of FIG. 5 have an additional control network 440" (not shown) added. The three networks are interconnected to form a triple redundancy system as follows. Elements in the first network 440 are identified without primes, elements in the second network 440' are identified with single primes, and elements in the third network 440" (not shown) are identified with double primes. The alarm control lines 430, 430' and 430" (not shown) are input in pairs to AND gates (not shown). The AND gate associated with network 440 receives as input the lines 430' and 430" and has its output connected to the NOR gate 414 and the D input of flip-flop 415, thereby replacing the line 430' as shown in FIG. 5.

In a similar manner, an AND gate (not shown) associated with network 440' receives as input the lines 430 and 430" and has its output connected in place of the line 430 in FIG. 5. A third AND gate associated with the control network 440" has as inputs the lines 430 and 430' and has its output connected in a manner analogous to those described.

In FIG. 5 for a triple redundancy system, the NOR gates 419 and 419' are each modified to have third input and a third NOR gate 419" having three inputs is provided. The gate 419" receives an input from a NAND gate 412" and an input from inverter 416' and an input fom inverter 416. Similarly, NOR gates 419 and 419' each receives an additional input from an inverter 416".

With the addition of a control network 440" in the manner described above, a triple redundancy system exists in which only one data path is enabled at any one time. Upon an alarm signal causing the active data path to be inactive, and provided neither of the other two data paths have an alarm, a race condition exists causing one of the non-alarmed inactive data paths to become active. If only one of the three data paths is non-alarmed, it is enabled. In this manner, a bistable, triple-redundant system is described.

While bistable double and triple redundant systems have been described tristable or other higher-order interlocking control networks can be established in accordance with the present invention.

While the invention has been particularly shown and described with reference to preferrred embodiments thereof it will be understood by those skilled in the art that various changes in form and details may be made therein without departing from the spirit and the scope of the invention.

What is claimed is:

1. In a system including a plurality of independent and redundant data paths wherein each data path is activated by a different enabling signal and including alarm means for generating alarm signals of different priority classes, an apparatus for controlling the active and inactive states of the data paths as a function of alarm signals comprising,
   a plurality of control networks, each one associated with a different data path for controlling the state of the associated data path with an enabling signal, each of said control networks including enabling means responsive to one or more alarm signals for forcing the associated data path inactive provided no other enabling means receives a higher priority alarm and including means for enabling the associated data path active in response to an inactive state of an enabling signal from another enabling means.

2. The apparatus of claim 1 wherein said alarm signals have two priority classes.

3. The apparatus of claim 1 wherein not more than one data path is active at a time.

4. The apparatus of claim 1 wherein said alarm means includes means for simulating an alarm to force said data paths into predetermined activity states.

5. The apparatus of claim 1 wherein said alarm means includes means for simulating alarms in each of said priority classes for forcing said data paths into predetermined activity states.

6. The apparatus of claim 1 further including means for inhibiting said enabling means from forcing the associated data path inactive until after a control signal is received.

7. In a system including redundant first and second data paths activated by first and second enabling signals, respectively, and including alarm means for generating first and second alarm signals associated with the first and second data paths, respectively, each of said first and second alarm signals having different priority classes, an apparatus for controlling the active and inactive states of the data paths as a function of the alarm signals comprising, first and second control networks associated with said first and second data paths, respectively, said control networks including first and second enabling means, respectively, for generating said first and second enabling signals, respectively, in response to the first and second alarm signals, respectively, and in response to the second and first enabling signals, respectively, said first and second enabling means responsive to an alarm signal for forcing the associated data path inactive provided the other enabling means does not receive a higher priority alarm.

8. The apparatus of claim 7 further including means in said first control network, responsive to said second alarm signals for inhibiting said first alarm signals from forcing said first data path inactive.

9. The apparatus of claim 8 wherein said alarm means includes means for simulating an alarm to force said data paths into predetermined activity states.

* * * * *